United States Patent [19]

Fukui et al.

[11] 4,166,026
[45] Aug. 28, 1979

[54] TWO-STEP HYDRODESULFURIZATION OF HEAVY HYDROCARBON OIL

[75] Inventors: Yoshio Fukui, Fujisawa; Yoshimi Shiroto, Yokohama; Mamoru Ando, Kawasaki; Yasumasa Homma, Yokohama, all of Japan

[73] Assignee: Chiyoda Chemical Engineering & Construction Co., Ltd., Yokohama, Japan

[21] Appl. No.: 925,553

[22] Filed: Jul. 17, 1978

[30] Foreign Application Priority Data

Jul. 15, 1977 [JP] Japan .................................. 52-84292

[51] Int. Cl.² ........................................... C10G 23/02
[52] U.S. Cl. ............................. 208/210; 208/216 PP; 252/457; 252/456; 252/459
[58] Field of Search .......................... 208/210, 216 PP

[56] References Cited

U.S. PATENT DOCUMENTS

| | | | |
|---|---|---|---|
| 3,725,251 | 4/1973 | Alpert et al. | 208/210 |
| 3,770,617 | 11/1973 | Riley et al. | 208/216 PP |
| 3,803,027 | 4/1974 | Christman et al. | 208/216 PP |
| 3,859,199 | 1/1975 | Gatsis | 208/210 |
| 3,867,282 | 2/1975 | Fischer et al. | 208/216 PP |
| 4,048,060 | 9/1977 | Riley | 208/210 |

Primary Examiner—George Crasanakis
Attorney, Agent, or Firm—Armstrong, Nikaido, Marmelstein & Kubovcik

[57] ABSTRACT

A process for hydrodesulfurization of heavy hydrocarbon oil containing asphaltenes and heavy metals in large amounts is disclosed. The heavy oil is hydrotreated in a continuous 2-step process. In the first step the heavy oil is subjected to hydrodemetallization and selective cracking of asphaltenes by the use of a catalyst having a unique selectivity therefor. In the second step the effluent from the first step is subjected to hydrodesulfurization to produce desulfurized oils of high grade by the use of a catalyst having a pore volume and pore size distribution particularly adapted for the hydrodesulfurization of the effluent.

20 Claims, 7 Drawing Figures

TWO-STEP HYDRODESULFURIZATION OF HEAVY HYDROCARBON OIL

BACKGROUND OF THE INVENTION

This invention relates to a process for hydrotreating a heavy hydrocarbon oil containing asphaltenes and heavy metals in large amounts (hereinafter referred to as a "heavy oil") to produce a desulfurized hydrocarbon oil (hereinafter referred to as a "desulfurized oil").

Heavy oils including petroleum crude oils, residues obtained by distilling crude oil under atomospheric or reduced pressure and crude oils extracted from tar sands generally contain large amounts of so-called asphaltenes, heavy metal compounds, sulfur compounds, nitrogen compounds and the like. The sulfur and nitrogen compounds and heavy metals such as organo-metallic compounds of vanadium or nickel are contained in the heavy oils in extremely large quantities as contaminants and are concentrated in the fraction of high molecular hydrocarbons like asphaltenes and cause difficulties in the catalytic hydrodesulfurization of the oils. Because of these difficulties, the heavy oils which are present in nature in large amounts and which are regarded as a promising hydrocarbon resource for the future, are presently utilized only as low grade fuel oils or as asphalt for road paving. When used as a fuel oil, however, oxides of sulfur, nitrogen and heavy metals are discharged into the asmosphere as a result of their combustion and thus are unacceptable from an ecological standpoint.

In view of these considerations, techniques for converting heavy oils containing large amounts of asphaltenes into more valuable desulfurized and substantially asphaltene-free and heavy metal-free oils are being extensively investigated. The conventional techniques for obtaining desulfurized oil of high grade by the hydrodesulfurization of heavy oils include the so-called direct hydrodesulfurization and indirect hydrodesulfurization processes. The direct hydrodesulfurization process is carried out in a fixed bed or in an ebullated bed. The development of the direct hydrodesulfurization technique is indebted to improvements in catalyst performance. The development of the process is related to a determination of an important correlation between the properties of the raw material oil and the physical structure of the catalyst.

As will be fully understood by those skilled in the art of petroleum refining, several disadvantages result if asphaltenes and heavy metals are present in the raw material oil treated according to the direct hydrodesulfurization process. Thus, for example, since the asphaltenes colloidally dispersed in the raw material oil are huge molecules, it is difficult for them to diffuse to actve sites within the pores of the catalyst. Because of this, the hydrodesulfurization is seriously inhibited. Moreover, the presence of asphaltenes accelerates the formation of coke and carbonaceous material resulting in a rapid lowering of the catalyst performance. Additionally, the heavy metals in the raw material oil accumulate on the surface of the catalyst and poison the catalyst considerably shortening the catalyst life.

One of the particularly important factors, therefore, for designing a catalyst for use in the direct hydrodesulfurization process is the choice of a catalyst having a pore size distribution which is adapted for the asphaltene content as well as the heavy metal content of the raw material oil. In accordance with the techniques of the prior art, when a raw material oil of comparatively good quality containing less than about 2 percent by weight of asphaltenes and less than 50 ppm of vanadium is subjected to hydrodesulfurizatidn, a highly active hydrodesulfurization catalyst having pores with diameters as small as about 80 to 100 Å is generally used. However, when a heavy oil of poor quality containing asphaltenes and vanadium in large amounts as high as about 2 to 5 percent by weight and 50 to 80 ppm, respectively, is subjected to hydrodesulfurization, not only does the resistance to diffusion within the pores become large, but the catalyst life is shortened markedly. Thus, it is substantially impossible to use the highly active catalyst having pores of only a small diameter. In order to increase the resistance of the catalyst to the poisoning of the catalyst by the asphaltenes and heavy metals and also to facilitate the diffusion to the active sites within the pores of the catalyst, even at the expense of sacrificing some of the catalyst performance, use is made of a catalyst having pores generally of a medium diameter of 100 to 150 Å and, in some cases, even larger diameters. In some cases, however, a catalyst having an efficient activity can hardly be obtained so that an increased consumption of the catalyst results. Additionally, the operating conditions such as reaction temperature, liquid hourly space velocity (volume of reactor feed oil per volume of catalyst per hour hereinafter referred to as LHSV) must be controlled more severely. This causes further economically undesirable circumstances such as large hydrogen consumption, low yields of products, etc.

In the case of a heavy oil which is the subject of this invention and which contains more than 5 percent by weight of asphaltenes and more than 80 ppm of vanadium, it is considered to be a matter of course to employ a catalyst which is greatly resistant to poisoning having pores of a still larger diameter such as 200 Å or more. The catalytic activity, however, of such a catalyst is too low and the reactivity of the sulfur compounds contained in heavy oils is also extremely low so that it is substantially difficult to hydrodesulfurize the heavy oil in accordance with one step by the prior art process for direct hydrodesulfurization.

In order to relieve the difficulties arising from the presence of asphaltenes and heavy metals in heavy oils a process has been proposed wherein a heavy oil is subjected to hydrotreatment to obtain a desulfurized oil by preliminarily hydrodemetallizing the heavy oil by the use of a comparatively inexpensive catalyst and then hydrodesulfurizing the resultant oil by the use of a hydrodesulfurization catalyst. This process is now being increasingly adopted. Problems still remain to be solved in this process, however, relating to the lowering of catalytic activity of the hydrodemetallization catalyst used in carrying out a continuous operation and relating to the regeneration or disposal of the spent catalyst and the like. Moreover, even though the catalyst poisoning due to heavy metals during hydrodesulfurization may be suppressed to some extent by the hydrodemetallization treatment, the problems relating to the poisoning and plugging of the desulfurization catalyst due to asphaltenes remain unsolved because the huge molecules of the asphaltenes in the heavy oils are essentially unchanged. On the other hand, in order to cause the cracking of the asphaltenes by the use of the conventional catalyst, extremely stringent reaction conditions should be employed. These reaction conditions, however, increase the hydrogen consumption as well as the catalyst consumption and thus the conventional process is industrially inpractical from the standpoint of economy.

In view of the present situation, therefore, a compromise has been adopted wherein the asphaltenes are preliminarily separated for removal by subjecting the raw material oil to physical treatment such as, for example, solvent deasphalting, and the resultant light fraction is subjected to hydrotreatment. Generally, the solvent deasphalting of the heavy oil is carried out using low molecular hydrocarbons such as propane, butane, pentane, etc. The asphaltene-containing fraction obtained as the byproduct can contain between 10 to 20 percent by weight, and in certain higher cases, 30% or more by weight of the raw material oil. Since the asphaltenes, as described above, contain concentrated amounts of contaminants such as heavy metals, sulfur compounds and nitrogen compounds, the resulting byproduct is extremely poor in quality and very low in utility and disposal of the byproduct is difficult. The conventional process, therefore, which includes the solvent deasphalting pretreatment is not economical and does not result in any significant improvement in the treatment of heavy oils containing asphaltenes in large quantities.

In the indirect hydrodesulfurization process the technical principle involved somewhat resembles that of the solvent deasphalting process. In the indirect hydrodesulfurization process the heavy oil is preliminarily subjected to vacuum distillation so as to separate a light fraction from a heavy fraction containing large amounts of asphaltenes and heavy metals. Only the light fraction which contains lower amounts of asphaltenes and heavy metals is hydrodesulfurized and then mixed with the above described heavy fraction. The liquid products obtained, however, contain asphaltenes as a matter of course so that the removal of the sulfur compounds, nitrogen compounds and heavy metals can be achieved only to a certain limited extent. As a result, the commercial value of the product is decreased.

It is an object of the present invention, therefore, to provide a process wherein heavy oils which contain asphaltenes in such large amounts that they can not be treated by the processes of the prior art are subjected to hydrotreatment in two efficient and consecutive steps to obtain desulfurized oil of low sulfur content. More particularly, it is an object of the first step of the process (step (a)) to subject a heavy oil to hydrodemetallization and simultaneous cracking of the asphaltenes by the use of a catalyst having a unique selectivity to produce a liquid product which is highly reactive for desulfurization and which is characterized by a molecular distribution within the range of 200 to 1200. It is an object of the second step of the process (step (b)) to subject the liquid products of the first step to hydrotreatment by the use of a hydrodesulfurization catalyst having a pore volume and pore distribution particularly adapted to convert the heavy oil to a desulfurized oil.

It is a further object according to the present invention to provide a hydroesulfurization of heavy oils containing extremely large amounts of asphaltenes and heavy metals in which catalyst consumption and hydrogen consumption are minimized by a process wherein hydrotreatment is carried out in two consecutive steps.

SUMMARY OF THE INVENTION

According to the present invention a process is provided for the production of desulfurized oil in which a heavy oil containing large amounts of asphaltenes is first contacted with hydrogen in the presence of a catalyst which is prepared by supporting one or more catalytic metals selected from the metals of Groups Va, VIa and VIII of the Periodic Table on a carrier composed mainly of magnesium silicate under a hydrogen to reactor feed oil ratio of 100 to 2000 normal liters of hydrogen per liter of reactor feed oil (hereinafter: Nl/l), a temperature of 350° to 450° C., a pressure of 30 to 250 kg/cm$^2$G, and an LHSV of 0.1 to 10 Hr$^{-1}$; the effluent from the first step as it is or after the hydrogen-rich gas has been separated therefrom is contacted with hydrogen in the presence of a catalyst which is prepared by supporting one or more catalytic metals selected from the metals of Groups Va, VIa, and VIII of the Periodic Table on a carrier composed of refractory inorganic oxide and having a total pore' volume of 0.50 to 0.80 cc/g, the pore size distribution being such that pores having diameters of 35 to 200 Å comprise 55 to 90% of the total volume of pores and pores having a diameter larger than 200 Å comprise 10 to 45% of the total volume of pores, under a hydrogen to reactor feed oil ratio of 100 to 2000 Nl/l, a temperature of 350° tog450° C., a pressure of 30 to 250 kg/cm$^2$G, an LHSV of 0.1 to 5 Hr$^{-1}$ and, thereafter, the hydrogen-rich gas is separated from the effluent to produce the desulfurized oil.

DESCRIPTION OF PREFERRED EMBODIMENTS

The heavy oils which may be treated according to the process of the present invention are those containing asphaltenes and heavy metals in large quantities; particularly those containing more than 5% by weight of asphaltenes and more than 80 ppm by weight (hereinafter: ppm) of vanadium. As examples of these heavy oils there may be mentioned:

(1) Venezuelan crude oil of 1.004 specific gravity (D$_{15}$/4° C.) containing as high as 11.8% by weight of asphaltenes, 1240 ppm of vanadium, 5.36% by weight of sulfur, and 5800 ppm of nitrogen;

(2) topped crude of Middle-Near East of 0.987 specific gravity (D$_{15}$/4° C.) containing about 6.5% by weight of asphaltene, 95 ppm of vanadium, 4.45% by weight of sulfur and 3000 ppm of nitrogen; and (3) vacuum residue from the other crude oils of Middle-Near East of 1.038 specific gravity (D$_{15}$/4° C.) containing about 8.2% by weight of asphaltenes, 270 ppm of vanadium, 3.53% by weight of sulfur and 7300 ppm of nitrogen, and the like.

The inventors of the process according to the present invention had noted sometime ago that a key to developing a hydrodesulfurization process for heavy oils containing large amounts of asphaltenes and heavy metals is the establishment of an effective process for cracking asphaltene. Thus, it was determined that when a heavy oil and, especially, a heavy oil containing 5% by weight or more of asphaltenes and 80 ppm or more of vanadium is subjected to hydrotreatment by use of a catalyst prepared by supporting one or more catalytic metals selected from the metals of groups Va, VIa, and VIII of the Periodic Table on a carrier composed mainly of magnesium silicate, a demetallization reaction takes place together with a simultaneous selective cracking of asphaltenes. Additionally, it was found that the metals of the heavy oil accumulate on the external surface of the catalyst and are fixed thereon together with the originally supported catalytic metals and that the accumulated layer of these metals acts as a new catalyst which exhibits activity for the cracking of asphaltenes and hydrodemetallization (Japanese Patent Application No. 66301/1977).

Figure 2:
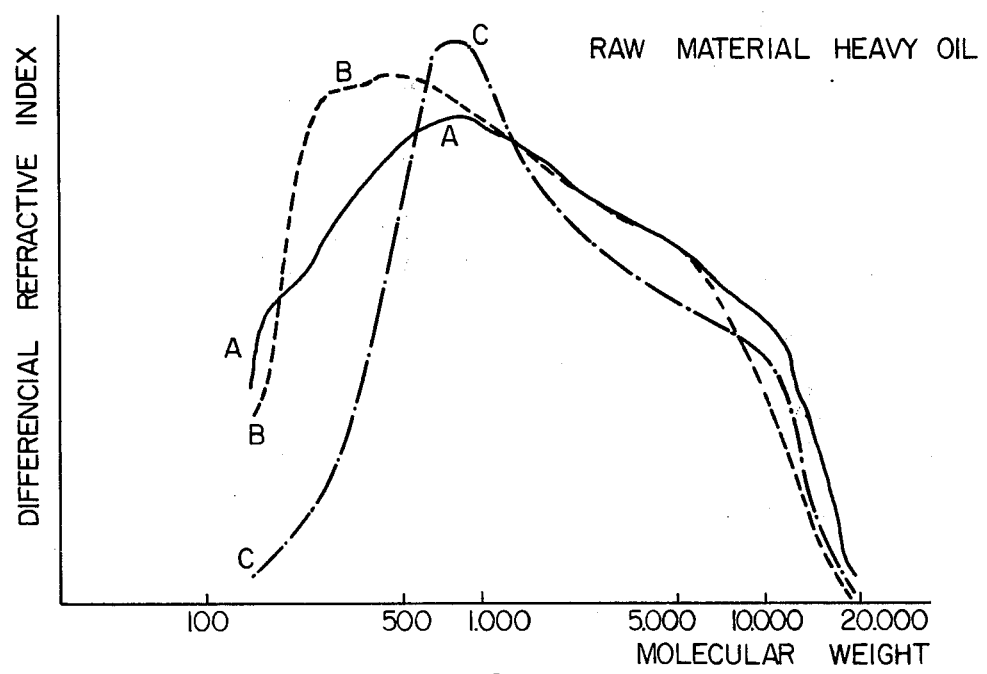
FIG. 2 is a graph illustrating the molecular weight distribution of raw material heavy oils prior to hydrotreating according to the present invention.
Figure 3:
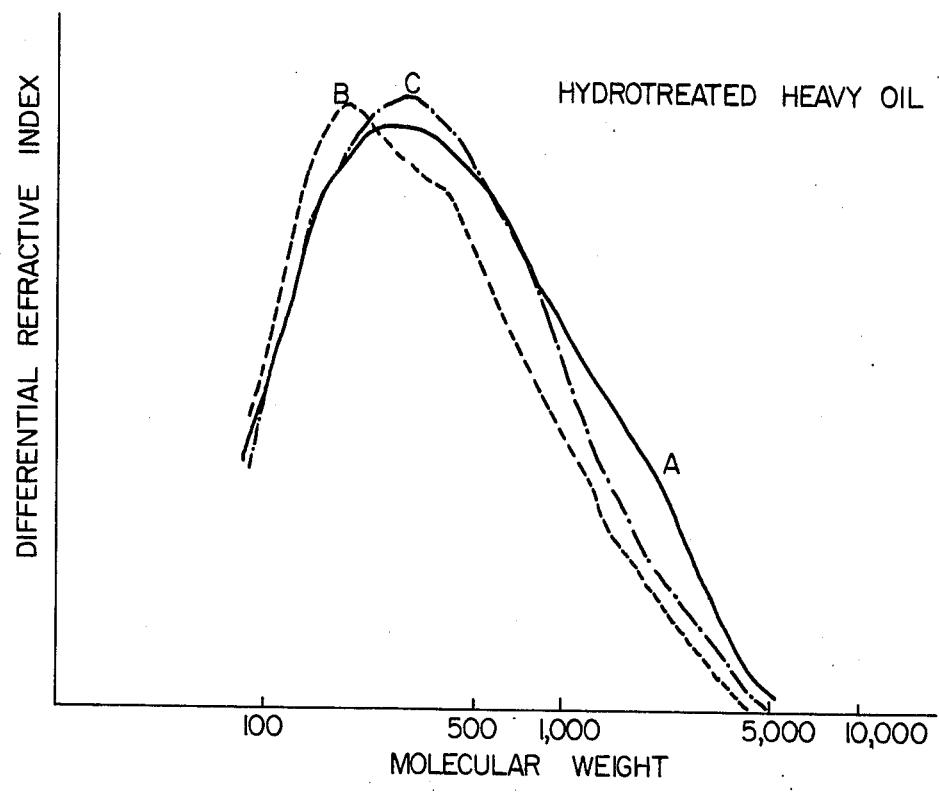
FIG. 3 is a graph illustrating the molecular weight distribution of the heavy oils of FIG. 2 following hydrotreating according to the present invention.

It was further determined during extensive investigation of the treatment of various types of heavy oils employing the above-described catalyst, which corresponds to the catalyst of the hydrotreatment of the first step of the process according to the present invention, that the hydrotreated products possessed unique properties. More particularly, it was determined that irrespective of differences in the kind of raw material oil hydrotreated employing the catalyst, the molecular weight of the hydrocarbons contained in the liquid products were distributed within a relatively narrow range of from about 200 to 1200; that the molecular weight of the asphaltenes in the liquid products was considerably low as compared with that of the asphaltenes in the raw material oil and that the sulfur in the liquid products is distributed more in the light fraction than in the heavy fraction. These facts are illustrated in Table 3 and FIG. 3 which show the results of a hydrotreatment process carried out in a gas-liquid cocurrent, up-flow, isothermal, fixed bed reactor packed with a catalyst [I] having a composition and physical properties as set forth in Table 2 below. The catalyst [I] was prepared by supporting Co and Mo on a carrier prepared from sepiolite which is composed of 1.3% $Al_2O_3$, 56.7% $SiO_2$, 23.9% MgO, and 0.4% $Fe_2O_3$. Boscan crude oil (A), Orinoco topped crude (B) and Khafji vacuum residue (C) containing large amounts of asphaltenes and vanadium and having the properties set forth in Table 1 and the molecular distribution shown in FIG. 2 were employed as the raw material heavy oils. The reactions were carried out at an initial reaction temperature of 405° C., a reaction pressure of 140 kg/cm²G, an LHSV of 0.4 $Hr^{-1}$ and a hydrogen to reactor feed oil ratio of 1000 Nl/l and for a time of 500 hours. It is to be noted that the analysis of the asphaltene content shown in Table 3 was carried out according to the standard of British Petroleum Association process IP 143/57 and the molecular weight distribution shown in FIGS. 2 and 3 was obtained by Gel Permeation Chromatography employing polystyrene el as the packing.

TABLE 1

| | Properties of Heavy Oils | | |
|---|---|---|---|
| Raw material oil | A Boscan Crude | B Orinoco Topped Crude | C Khafji Vacuum Residue |
| Specific gravity ($D_{15}/4°$ C.) | 1.004 | 1.022 | 1.036 |
| Asphaltenes (% by weight) | 11.8 | 14.1 | 13.5 |
| Sulfur (% by weight) | 5.40 | 3.92 | 5.27 |
| Vanadium (ppm) | 1,240 | 478 | 181 |
| Average molecular weight of asphaltenes | 5,600 | 2,800 | 5,280 |

TABLE 2

| Catalyst [I] | | |
|---|---|---|
| Composition | | |
| $Al_2O_3$ | (% by weight) | 5.5 |
| $MoO_3$ | (% by weight) | 6.9 |
| CoO | (% by weight) | 1.9 |
| $SiO_2$ | (% by weight) | 48.8 |
| MgO | (% by weight) | 18.6 |
| Physical Properties | | |
| Surface area (m²/g) | | 171 |
| Pore volume (cc/g) | | 0.79 |
| Pore size distribution | | |
| 35–100 (Å in diameter) | | 0.031 (cc/g) |
| 100–200 | | 0.094 |
| 200–300 | | 0.387 |
| 300–600 | | 0.278 |

TABLE 3

| | Properties of Liquid Products | | |
|---|---|---|---|
| Raw material oil | A | B | C |
| Specific gravity ($D_{15}/4°$ C.) | 0.948 | 0.973 | 0.992 |
| Asphaltene (% by weight) | 3.5 | 4.5 | 6.9 |
| Sulfur (% by weight) | 2.60 | 2.35 | 3.45 |
| Vanadium (ppm) | 110 | 82 | 52 |
| Average molecular weight of asphaltene | 1,400 | 1,200 | 1,600 |
| Chemical hydrogen comsumption (SCF/BBL) | 400 | 230 | 260 |

It is clear from the results set forth in Table 3 that both the cracking of asphaltene and the removal of vanadium in the raw material oil were effectively achieved and (referring to FIGS. 2 and 3) that the molecular weight distribution of the raw material oil varied over a wide range of from 100 to 20,000, with a considerable difference being found depending on the kind of raw material oil whereas the molecular weight distribution of the liquid products is similar and varies within a range of about 200 to 1200 and is essentially independent of the type of the raw material oil. It is also seen from Tables 1 and 3 that the average molecular weight of the asphaltenes in the liquid products is considerably lower than that of the asphaltenes in the raw material oil which indicates that the cracking of the asphaltenes in the raw material oil has proceeded to a considerable extent. The measurement of the average molecular weight of the asphaltenes indicated in the tables were determined by vapor pressure osmometry.

The significance of these facts may be seen by referring to Table 5 with shows the results of a treatment wherein the raw material oil (A) (Boscan crude oil) of Table 1 was hydrotreated using a conventional hydrodesulfurization catalyst having the composition and properties shown in Table 4 under conditions such that the same rate of hydrodesulfurization was obtained. It was found that when use is made of the hydrodesulfurization catalyst [II] of the prior art, the hydrodemetallization and cracking of asphaltenes in the heavy oil hardly occurs and the average molecular weight of the asphaltenes in the liquid products differs very little from that of the asphaltenes in the raw material oil.

TABLE 4

| Catalyst [II] | | |
| --- | --- | --- |
| Composition | | |
| Al₂O₃ | (% by weight) | 78.4 |
| MoO₃ | (% by weight) | 15.0 |
| CoO | (% by weight) | 4.1 |
| SiO₂ | (% by weight) | 0.3 |
| Physical Properties | | |
| Surface area (m²/g) | | 155 |
| Pore volume (cc/g) | | 0.601 |
| Pore size distribution | | |
| 35–100 (Å in diameter) | | 0.024 (cc/g) |
| 100–200 | | 0.499 |
| 200–300 | | 0.058 |
| 300–600 | | 0.020 |

TABLE 5

| Properties of Liquid Products | |
| --- | --- |
| Raw material heavy oil | A |
| Specific gravity (D₁₅/4° C.) | 0.954 |
| Asphaltene (% by weight) | 9.8 |
| Sulfur (% by weight) | 2.60 |
| Vanadium (ppm) | 520 |
| Average molecular weight of asphaltene | 5,300 |
| Chemical hydrogen consumption (SCF/BBL) | 420 |

Furthermore, in order to determine the sulfur distribution of the liquid products, the products having the properties shown in Table 3 and Table 5 were obtained by hydrotreating the raw material oil (A) of Table 1 using catalyst [I] and catalyst [II] and the resulting products, respectively, were separated into three components: asphaltenes, 1000° F.+ fraction and 1000° F.− fraction, and the sulfur content of each component was determined. The results are shown in Table 6:

TABLE 6

| Sulfur Distribution in Oil Products | | |
| --- | --- | --- |
| Catalyst used | Catalyst [I] | Catalyst [II] |
| Sulfur content of asphaltene (% by weight) | 2.71(0.09)* | 5.18(0.57)* |
| Sulfur content of 1000° F.+ fraction (% by weight) | 2.78(0.82) | 4.29(1.46) |
| Sulfur content of 1000° F.− fraction (% by weight) | 2.52(1.69) | 1.04(0.57) |

*The numeral in parentheses indicates the amount of sulfur (g) present in 100 g of liquid products.

The above results indicate that when hydrotreatment is carried out employing catalyst I, the major portion of the sulfur is distributed in the lighter fractions thereby facilitating the hydrodesulfurization.

As described above, the inventors of the process according to the present invention have previously noted the unique properties of the liquid products obtained by the hydrotreatment of various heavy oils employing the above-described catalyst and as a result of further investigations to determine the most effective catalyst and process for hydrodesulfurizing the liquid products, the process according to the present invention for hydrodesulfurization was developed.

It has been determined according to the present invention that to carry out an effective hydrodesulfurization in the second step (step (b)) of the 2-step hydrotreatment process according to the present invention it is essential to employ a catalyst having an activity and life which are particularly adapted to the treatment of the liquid products of the first step (step (a)). More particularly, it has been determined that a catalyst which consists of both large-sized pores and small-sized pores is most suitably adapted to the hydrodesulfurization step. The active sites in the smaller sized pores of such a catalyst serve to hydrodesulfurize the liquid product obtained by the hydrotreatment in the first step while the active sites in the larger-sized pores play an important role in the hydrodemetallization of the remaining metals and prevent the catalyst from being poisoned by metals and asphaltenes in the smaller-sized pores and also serve to prevent a surface area reduction. In other words, such a catalyst is one that is most adapted for the simultaneous hydrodesulfurization of a light fraction that is highly reactive with respect to hydrodesulfurization, on the one hand, and of a fraction containing asphaltenes and vanadium that are strong catalyst poisons, on the other hand.

Thus, a process has been developed according to the present invention combining two steps and which is an economical process for the production of the desulfurized oil of a high grade and which can remove sulfur contained in the oils at a high rate with less hydrogen consumption and catalyst consumption as compared to the conventional process wherein a residual oil, etc., is directly hydrosulfurized in a one-step treatment.

The process according to the present invention is an excellent process which can be utilized in converting the substantial quantity of heavy oil to a desulfurized oil of high grade and low sulfur content either in the case where a heavy oil of inferior quality containing large amounts of asphaltenes and metals is to be treated or in the case where the quality specifications for the product oil are exceptionally severe. According to the process of the present invention, particularly, a process wherein the liquid product obtained in step (b) is physically separated into the heavy fraction and the light fraction and the heavy fraction containing asphaltenes is recycled to step (a) and/or step (b), a heavy oil can be readily hydrotreated. Furthermore, the process according to the present invention has a beneficial effect upon the hydrodenitrogenation of the heavy oil treated according to the two-step process.

The catalyst employed in the first step (step (a)) of the process according to the present invention is prepared by supporting one or more catalytic metals selected from the metals of Groups Va, VIa, and VIII of the Periodic Table on a carrier composed mainly of magnesium silicate. The kind and the amount of the metal or metals supported may be chosen according to the properties of the heavy oil to be treated and the characteristics of the metal. For example, in the case of metals of Groups VIa and VIII, the metals of Group VIII are preferably supported in an amount of 1 to 10% by weight as the oxide of the metal and the metals of Group VIa are preferably supported in an amount of 4 to 15% by weight. The metals most preferred for use in the process according to the present invention are Co, Mo, W, Ni and V. These metals may also be used in combination. As the solid carrier, use can be made of various materials containing magnesium slicate as a major component and preferable ones are naturally occurring minerals such as sepiolite, attapulgite, palygorskite etc. and synthetic products closely related thereto in composition and structure. The composition thereof is 30 to 65% by weight of SiO₂, 10 to 30% by weight of MgO, less than 20% by weight of Al$_2$O$_3$, less than 25% by weight of Fe$_2$O$_3$, less than 5% by weight of FeO and less than 3% by weight of CaO. Natural minerals such as above are available at low cost and, moreover, their reactivity can readily be enhanced by virtue of their unique physical structure. The catalysts such as above, are preferably prepared by the methods specified in U.S. Ser. No. 748,752.

The catalyst employed in the second step (step (b)) of the process according to the present invention is a catalyst prepared by supporting one or more catalytic metals selected from the metals of Groups Va, VIa, and VIII of the Periodic Table on refractory inorganic oxides as a carrier which possesses a total pore volume of 0.50–0.80 cc/g, the pore size distribution being such that the volume of pores having a diameter of 35 to 200 Å are 55–90% of the total pores and the volume of pores having a diameter larger than 200 Å are 10 to 45% of the total pores. The kind and the amount of the metal supported is chosen according to the properties of the heavy oil employed as the raw material oil and the characteristics of the metal. Thus, for example, with respect to metals of Groups VIa and VIII, the metals of Group VIII are preferably supported in an amount of 1 to 10% by weight as oxide, while the metals of Group VIa are supported in an amount of 4 to 15% by weight. The metals most preferred as the catalytic metals are Co, Mo, W, Ni and V. These metals may also be used in any combination.

As the above described refractory inorganic oxides, preferred are alumina, silica, magnesia, boria, alumina-silica, alumina-magnesia, alumina-boria, silica-magnesia, silica-boria, magnesia-boria, alumina-silica-magnesia, alumina-silica-boria, alumina-magnesia-boria and silica-magnesia-boria. The most preferred supports are alumina and silica-alumina.

The catalyst which possesses the above-described pore size distribution and pore volume may be prepared by controlling the pore size distribution by a conventional method. For example, the catalyst is obtained in such a way that boehmite type of aluminum hydroxide is first formed as xerogel whose average crystal diameter is about 70 Å, and after grinding said xerogel into particles several microns in size, the above-described aluminum hydroxide is further added thereto as a molding aid and the resulting mixture is molded.

The catalytic metals of the catalyst useful in the two-step hydrotreating process according to the present invention may be supported on the refractory inorganic oxides by the usual conventional methods such as immersion, spraying and the like.

The size and shape of the catalyst particles employed according to the present invention are not critical in either step (step (a) or step (b)) although it is desirable that they have a diameter larger than 0.8 mm in nominal diameter. The object of the process according to the present invention will be achieved even in a case where, as a special example, use is made in step (a) of a catalyst whose metal components are supported on a carrier consisting of mainly magnesium silicate which is fixed in the form of a layer on another solid such as, for example, the wall of a pipe, etc.

The reaction zone may be of a conventional type such as a fixed bed, moving bed, ebullated bed, etc. or the reaction system may be a conventional type such as a tubular type of reaction system. The reactant may be fed to the reaction zone either upwardly or downwardly, i.e., the flow of the gas and liquid in the reactor may be either upward flow or downward flow.

Two separate reactors may be employed as the reaction zones for step (a) and step (b), or the reaction zones of the two steps may be provided within a single reactor. Thus, the effluent from step (a) may be introduced to the second step (b) as such, or the effluent may be subjected to gas-liquid separation to remove the hydrogen-rich gas and the liquid products may be introduced to step (b). Alternatively, the liquid products which have been separated from the hydrogen-rich gas may be stored in a tank and, as occasion demands, sent to step (b).

The reaction conditions of the hydrotreatment are common in the two treatment steps in the presence of the above-described catalyst with the exception of LHSV. Thus, reaction temperatures in the two steps are in the range of 350° to 450° C. and preferably, 390° to 420° C., and the pressure is within the range of 30 to 250 kg/cm$^2$G and, preferably, 80 to 160 kg/cm$^2$G. In step (a) the LHSV is within the range of 0.1 to 10 Hr$^{-1}$ and, preferably, 0.2 to 5 Hr$^{-1}$ whereas in step (b) the LHSV is within the range of 0.1 to 5 Hr$^{-1}$ and, preferably, 0.2 to 2 Hr$^{-1}$.

At a reaction temperature below about 350° C., the catalyst does not exhibit sufficient activity and the rate of conversion in the hydrotreatment falls short of a practical level. Also, at temperatures above about 450° C., undesirable side reactions such as coking, etc., become marked resulting in the degradation of the product oil quality as well as in a decrease in catalytic activity.

Under a reaction pressure below 30 kg/cm$^2$G, coke is formed in amounts too excessive to maintain the normal activity of the catalyst. On the other hand, when the pressure exceeds 250 kg/cm$^2$G, the hydrocracking reaction becomes violent with an increase in hydrogen consumption and a decrease in the yield of product oil such that the cost of the reactor and related equipment increases so markedly that the process is no longer practical from an economical standpoint.

At an LHSV of 0.1 Hr$^{-1}$ or less, the residence time of the oil is protracted such that the heavy material component deteriorates by the thermal action resulting in the degradation of the quality of the product oil. On the other hand, when the LHSV exceeds 10 Hr$^{-1}$ in step (a) and 5 Hr$^{-1}$ in step (b), the rate of conversion per pass becomes impractically low. Also, in the practice of the process according to the present invention, the mixing ratio of hydrogen to reactor feed oil fed to the reaction zone is 100 to 2000 Nl/l and, preferably, 500 to 1000 to Nl/l. This is because below 100 Nl/l, not only does the hydrogen become deficient in the reaction zone, but the retarded transfer of the hydrogen into the liquid favors the coking reaction thereby adversely affecting the catalyst and the properties of the product oil. On the other hand, when the ratio of hydrogen to reactor feed oil, i.e., heavy oil fed to the reactor as the raw material, exceeds 2000 Nl/l there is nothing to be improved in the process although there is no obstacle to this aspect of the reaction. Since the cost of the compressor being used for the circulation of hydrogen increases with the amount of hydrogen circulated, the upper limit in practice of the hydrogen circulation is 2000 Nl/l since above this rate, the cost is remarkedly high. Additionally, with respect to the hydrogen-rich circulating gas fed to the reaction zone, it has been found that not only does the presence of hydrogen sulfide therein result in no adverse effect upon the reaction, but, instead, the presence of the hydrogen sulfide in some suitable amount has a tendency to accelerate the reaction. The reason for this is believed to be that the catalyst employed in step (a) reacts with hydrogen sulfide under some unknown mutual interaction under the reaction conditions whereby the hydrogen sulfide plays a role in the maintenance of the catalytic activity. Therefore, the feeding of hydrogen gas containing up to 10% of hydrogen sulfide to the reaction zone is within the scope of the present invention. The effluent treated under the above-described reaction conditions in step (a) is sent to the gas-liquid separation step, where it is separated into a hydrogen-rich gas and a substantially liquid product.

The method and apparatus which may be employed for the gas-liquid separation are those ordinarily used in the hydrodesulfurization of heavy oils in a fixed bed, or the like, there being no limitation with respect to them. The liquid products obtained in this way are desulfurized oils of excellent quality.

On the other hand, when the asphaltene content, as well as the heavy metal content, of the raw material heavy oil is extremely large, it is very difficult to obtain a product of the desired specifications. In such a case, the above-described liquid products are separated into a substantially asphaltene-free and heavy metal-free light fraction and a heavy fraction containing impurities by subjecting the liquid products to a separation step such as distillation or solvent deasphalting and the light fraction is recovered as the desired product oil. The heavy fraction, if desired, is recycled to step (a) and/or step (b), and thus a substantial quantity of raw material oil can be converted to a desulfurized oil of excellent quality. Moreover, an embodiment wherein step (a)' is adopted to provide a recycling loop of heavy fraction with the process scheme and conditions the same as in step (a) and hydrotreat only the said heavy fraction with a catalyst which was prepared by supporting one or more catalytic metals selected from the metals of Groups Va, VIa, and VIII of the Periodic Table on a carrier composed of magnesium silicate under a hydrogen to reactor feed oil ratio of 100 to 2000 Nl/l, a temperature of between 350° to 450° C., a pressure of 30 to 250 kg/cm$^2$G and an LHSV of 0.1 to 10 Hr$^{-1}$ is also within the scope of this invention. These embodiments are adopted when the ratio of recycling heavy fraction to raw material oil is too large owing to the poor activity of asphaltenes and heavy metals in the raw material oil and the severe specification of product oil. In the case wherein such a circulation system is introduced, the feed point of the raw material oil did not necessarily be located before the first step but may be located between the step (b) and the separation step of light and heavy fractions. As a matter of course when this embodiment is employed, the light fraction which exists originally in the raw material heavy oil and is separated therefrom is not subjected to hydrodesulfurization since it is recovered directly from the separation step. Therefore, the oil will not be sufficiently treated where an especially low sulfur content is required for the product oil. The oil obtained by the above embodiment, however, can be easily hydrodesulfurized, for example, by the conventional "indirect" method. This embodiment may be employed where the raw material oils contain comparatively less asphaltenes and metals and/or sulfur compounds and heavy metal compounds are concentrated more in the heavy fraction. In these cases, reaction in step (a) is effectively carried out by concentrating asphaltenes and heavy metals and reducing the quantity of feed oil to the reactor. As a consequence of this procedure, reaction in step (b) becomes easier and less susceptible to degradation of catalyst activity.

Figure 1:
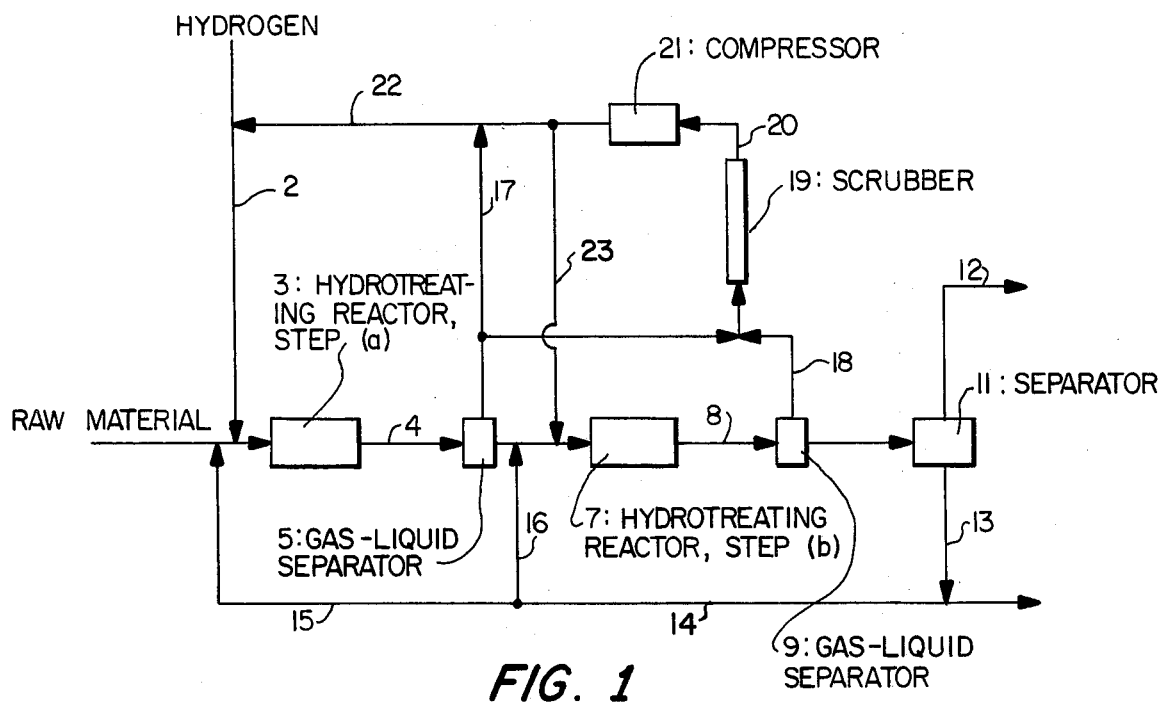
FIGS. 1, 5, 6 and 7 are flow diagrams illustrating embodiments of the process according to the present invention.

In an embodiment of the process according to the present invention where solvent deasphalting is employed in the separation step, the solvent used is one or more members selected from the group consisting of low molecular hydrocarbons such propane, butane, isobutane, pentane, isopentane, neopentane, hexane, isohexane and the like, and the solvent is contacted countercurrently with the liquid products. Solvent deasphalting is usually carried out under a temperature of 10° to 250° C. and, preferably, 50° to 180° C., and a pressure of 3 to 100 atmospheres and, preferably, 10 to 50 atmospheres. Referring now to FIG. 1, one embodiment of the process according to the present invention is explained.

In the process illustrated in FIG. 1, raw material heavy oil is introduced via line 1 and, after having been mixed with hydrogen-containing gas via line 2 which consists of circulating hydrogen via line 22 and make-up hydrogen, is heated (by means not shown in the figure) and is then introduced into hydrotreating reactor 3 (step (a)). The heavy oil after being subjected to hydrotreatment involving cracking of asphaltenes and removal of heavy metals in the hydrotreating reactor 3 is introduced into gas-liquid separator 5 via line 4. In separator 5, it is separated into a gaseous component rich in hydrogen and hydrogen sulfide and a liquid component. The gaseous component is introduced into scrubber 19 via line 17. The liquid component, on the other hand, is introduced into hydrotreating reactor 7 (step (b)) via line 6 after having been mixed with a portion of the hydrogen-containing gas being circulated via line 23. In hydrotreating reactor 7, it is subjected to hydrotreatment involving chiefly hydrodesulfurization and hydrodenitrogenation. The effluent from hydrotreating reactor 7 is introduced into gas-liquid separator 9, where it is separated into a gaseous component rich in hydrogen and hydrogen sulfide and a liquid component. The gaseous component is introduced into scrubber 19 via line 18 while the liquid component is withdrawn and recovered as a product oil or is led to separator 11 via line 10 and separated into a light fraction and a heavy fraction. The heavy fraction separated in separator 11 is withdrawn via line 13 and recycled to hydrotreating reactor 3 via lines 14 and 15 or to hydrotreating reactor 7 via lines 14 and 16. Additionally, if desired, a portion of the heavy fraction may be withdrawn via line 24 and utilized by gasification as the hydrogen-rich gas. In addition, the above-described gaseous component sent to scrubber 19 is scrubbed in a gas scrubber so as to remove impurities such as hydrogen sulfide, ammonia, etc., and then led via line 20 to compressor 21 where it is boosted and supplied as circulating hydrogen.

EXAMPLE 1

Khafji vacuum residue (Table 1C) was used as a raw material oil. A catalyst having the properties as shown in Table 2 was prepared as follows. Sepiolite ore was finely ground in a ball mill for 6 hrs., and a powder of a size capable of passage through a 50 mesh-sieve was obtained. The powder was kneaded with an aqueous solution of aluminum salt whose concentration was 5% by weight as calculated in terms of alumina on the basis of water. This resulting paste was extruded through a circular die having a hole 0.9 mm in diameter. The extrudate was dried in an air bath firstly at 120° C. and then for 3 hrs. in a rotary kiln at 200° C.

Next, the extrudate carrier was immersed in an aqueous solution of cobalt nitrate and ammonium para molybdate. As a result, 2% cobalt and 6% molybdenium, by weight, were supported on said carrier. The material was dried at 120° C. for 2 hrs. and calcined at 500° C. for 3 hrs. Hydrotreating was carried out in a reactor of the gas-liquid co-current, up-flow, isothermal, fixed bed-type under an initial reaction temperature of 405° C., a reaction pressure of 140 kg/cm$^2$G, an LHSV of 0.4 Hr$^{-1}$, and a hydrogen to reactor feed oil ratio of 1000 Nl/l. The liquid products obtained by the treatment were immediately subjected to the next step in the presence of a catalyst having the composition and properties listed below under a reaction pressure of 140 kg/cm$^2$G, an LHSV of 0.9 Hr$^{-1}$ and a hydrogen to reactor feed oil ratio of 1000 Nl/l, while increasing the reaction temperature from 390° C. so that the sulfur content of the liquid products is about 0.5% by weight.

| Composition of Catalyst | |
|---|---|
| Al$_2$O$_3$ | 81.0% by weight |
| SiO$_2$ | 0.5 |
| MoO$_3$ | 15.0 |
| CoO | 3.5 |
| Physical Properties of Catalyst | |
| Surface area | 341 m$^2$/g |
| Pore volume | 0.786 cc/g |
| Pore size distribution | |
| 35–100 (Å in diameter) | 0.419 cc/g |
| 100–200 | 0.055 |
| 200–300 | 0.020 |
| 300–400 | 0.013 |
| 400–600 | 0.010 |
| above 600 | 0.269 |

The above-described catalyst was prepared based on the requirements of this invention and especially satisfies the requirements for the pore volume and the pore size distribution. In addition, the pore volume and the pore size distribution were measured according to the mercury penetration method (pressure: 60,000 psig).

The properties of the liquid products obtained in the two step treatment are as follows:

| | |
|---|---|
| Specific gravity (D$_{15}$/4° C.) | 0.941 |
| Asphaltene content | 2.1% by weight |
| Sulfur content | 0.5% by weight |
| Vanadium | 12 ppm |
| Chemical hydrogen consumption | 720 SCF/BBL |
| Step (a) | 260 |
| Step (b) | 460 |

It is understood that the chemical hydrogen consumption in step (b) is comparatively small to obtain low sulfur liquid product.

Figure 4:
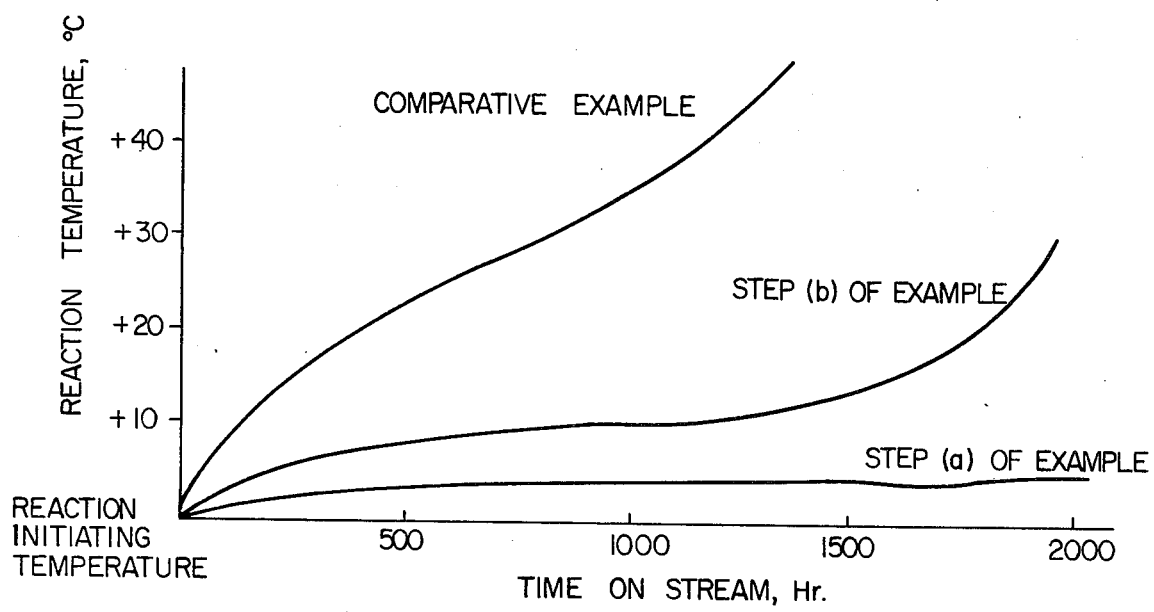
FIG. 4 is a graph illustrating comparison of the variation in reaction temperature versus the time on stream for each step of Example 1 and the comparative example of the present sepcification.

FIG. 4 shows the respective temperature curves of the catalyst bed for maintaining the sulfur content of the liquid products constant in the cases of step (a) and step (b) in this example and the comparative example as later described.

The temperature in step (a) is the result obtained when the temperature was raised so as to maintain the rate of decomposition of asphaltenes at about 70%.

The temperature rise in step (b) is slow and it is seen that the catalyst activity is well maintained for a prolonged time. Deactivation is caused by the deposition of metals in oil and the raising of temperature is necessary to compensate the lowering of catalyst activity on one hand but it promotes coke formation on the surface of catalyst on the other hand. Therefore, with the progress of deactivation, the temperature rise is needed more and more and the catalyst life will become shorter.

By comparison with the comparative example it is understood that the catalyst life has been satisfactorily improved.

COMPARATIVE EXAMPLE

Using a known hydrodesulfurization catalyst (whose properties are shown in Table 4) the same raw material oil as in Example 1 was subjected to a one-step hydrotreatment in the same reactor as in Example 1, in which the catalyst bed was 2,300 cm high, under a reaction pressure of 140 kg/cm$^2$G, an LHSV of 0.28 Hr$^{-1}$, and a hydrogen to reactor feed oil ratio of 1000 Nl/l, while controlling the reaction temperature so as to maintain the sulfur content of the liquid products at 0.5% by weight. The above-described LHSV of 0.28 Hr$^{-1}$ corresponds to the case where the same amount of the raw material oil as in Example 1 is fed to a catalyst bed whose volume is equal to the sum of the catalyst volumes in step (a) and step (b) in Example 1. The relationship between the increase in the reaction temperature and the reaction time is shown in FIG. 4.

The properties of the oil produced are as follows:

| | |
|---|---|
| Specific gravity (D$_{15}$/4° C.) | 0.928 |
| Asphaltene content | 6.7% by weight |
| Sulfur content | 0.5% by weight |
| Vanadium | 15 ppm |
| Chemical hydrogen consumption | 1,120 SCF/BBL |

As clearly seen from the above results, in Example 1, as compared with the comparative example, the lowering in the catalytic activity is very little, thus making the catalyst consumption small. Moreover, the hydrogen consumption is also small.

On the other hand, the gasfication of the oil becomes marked and the yield is considerably decreased in comparative example.

EXAMPLE 2

This example illustrates the case where the heavy fraction of the liquid products in step (b) of this invention is recycled to the reaction step.

300 cc/Hr of Boscan crude oil (designated as A in Table 1) was treated according to the process as shown in FIG. 1.

The reactors used in step (a) and step (b) were respectively a reactor of gas-liquid co-current, up-flow, isothermal, fixed bed type which had a diameter of 1 inch and a catalyst bed depth of 160 cm in step (a) and of 70 cm in step (b), with each being packed with the respective catalysts used in step (a) and step (b) in Example 1.

As the gas-liquid separator use was made of a high temperature, high pressure separator at a temperature of 150° C. under a pressure substantially the same as in the reactor.

The gas scrubbing was carried out in a high pressure gas absorbing apparatus using monoethanol amine as the absorbent.

The step (a) was started under a reaction pressure of 140 kg/cm$^2$G, an LHSV of 0.4 Hr$^{-1}$, a hydrogen to reactor feed oil ratio of 1000 Nl/l and a reaction temperature 405° C. while controlling the temperature so as to maintain the rate of cracking of asphaltene at about 70%. Then, step (b) was carried out under a reaction pressure of 140 kg/cm²G, an LHSV of 0.9 Hr⁻¹, a hydrogen to reactor feed oil ratio of 1000 Nl/l, and a reaction temperature of 380°-400° C.

The oil produced was distilled at an average tower temperature of 290° C. under a pressure of 40 mmHg by the use of a packed tower with the number of theoretical plates being about 20, and a desulfurized oil was obtained in a yield of 98% by volume. The heavy fraction from the distillation column, which was 100 cc/Hr, was mixed with the liquid products obtained in step (a) and then treated in step (b).

The above treatment was tested in a continuous operation of 1200 hours, and during the period the whole process could be operated smoothly without causing any trouble.

The properties of the liquid products in step (a), in the step (b), and of the light fraction after the separation step are shown below.

| Step | Step (a) | Step (b) | Separation Step |
|---|---|---|---|
| Specific gravity (D$_{15}$/4° C.) | 0.952 | 0.928 | 0.901 |
| Asphaltene content (% by weight) | 3.9 | 0.8 | trace |
| Sulfur content (% by weight) | 2.80 | 0.55 | 0.24 |
| Vanadium (ppm) | 120 | 30 | trace |
| Chemical hydrogen total consumption (SCF/BBL) | | 820 | |

Although the invention has been described in conjunction with the foregoing preferred embodiments, it is not intended to be limited thereto but, instead, includes all those embodiments within the scope and spirit of the appended claims.

EXAMPLE 3

Figure 5:
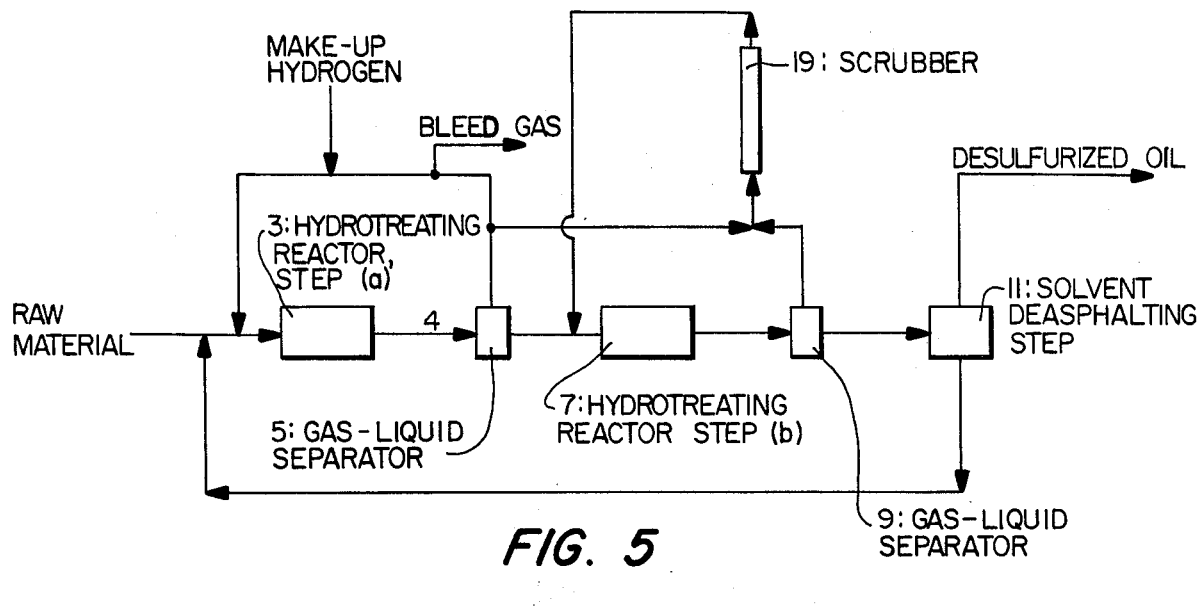

This example illustrates the case where the liquid products from step (b) are separated into the light fraction and the heavy fraction by solvent deasphalting process and the heavy fraction is recycled to step (a). FIG. 5 shows the flow diagram of this embodiment. Khafji vaccum residue containing asphaltenes and vanadium in large quantities was used as a raw material oil. The properties of the said oil are as shown on Table 1-C. As described above, said raw material oil was mixed with the heavy fraction from the solvent deasphalting process 11, and followed to mix with a hydrogen-rich gas which involved make-up hydrogen and recycled hydrogen-rich gas from a gas-liquid separation step 5. The resultant mixture was fed to the reactor 3, i.e. step (a). The reaction in reactor 3 was carried out in the same manner as step (a) in Example 1 & 2. Reaction Conditions of reactor 3 are as shown below.

| Reaction Conditions of reactor 3 | | |
|---|---|---|
| Temperature | (°C.) | 400-405 |
| Pressure | (kg/cm²G) | 140 |
| LHSV* | (Hr⁻¹) | 0.35 |
| H₂/oil ratio | (Nl/l) | 1,000 |

*Based on raw material oil

In reactor 3, reactor feed oil was hydrotreated to crack asphaltenes and to remove heavy metal components therefrom. The reaction effluent from the reactor 3 was sent to gas-liquid separation step 5 and separated into a gaseous stream, rich in hydrogen and hydrogen sulfide, and liquid product. As already described, the majority of said gaseous stream was recycled to the reactor 3 and used as feed gas sources. On the other hand, said liquid product was mixed with hydrogen-rich gas recycled from 19 through 7, step (b), and fed to reactor 7, i.e. step (b). The reaction in reactor 7 was carried out in the same manner as step (b) in Examples 1 & 2. Reaction Conditions of reactor 7 were as follows.

| Reaction Condition of reactor 7 | | |
|---|---|---|
| Temperature | (°C.) | 385-410° C. |
| Pressure | (kg/cm²G) | 140 |
| LHSV* | (Hr⁻¹) | 0.8 |
| H₂/oil ratio | (Nl/l) | 1,000 |

Reaction effluent from reactor 7 was sent to gas-liquid separation step 9 and separated into a gaseous stream, rich in hydrogen and hydrogen sulfide, and a liquid product. Said gaseous stream was mixed with a portion of the gas from step 5 and sent to gas scrubbing step 19. In step 19, hydrogen sulfide and ammonia, etc. were removed from the gas. The treated gas from this step 19 was recycled to reactor 7 and used as feed gas source. On the other hand, liquid product from the reactor 7 was sent to the solvent deasphalting step 11 using pentane as solvent and separated into asphaltene- and a heavy metal-free desulfurized light fraction and heavy fraction containing asphaltenes and heavy metals. Deasphalting was carried out at an average extractor temperature of 160° C., under a pressure of 40 kg/cm²G which was sufficient to maintain a liquid phase operation, and at a solvent ratio of 7 vol/vol. In this step 11, about 60% by volume of the above-described liquid product was separated and transferred into the solvent recovery process and product oil was produced therein. A heavy fraction undissolved in solvent was withdrawn from extractor bottom and was recycled to the reactor 3 at about 200° C. to maintain sufficient fluidity. The hydrogen-rich gas fed to reactor 3 contained hydrogen sulfide and ammonia in considerable content, because said gas was not subjected to the gas scrubbing step 19. But, a part of said hydrogen-rich gas was removed as a purge stream so as to prevent from excess accumulation of light gas. In this example, the composition of hydrogen sulfide in recycle gas was set and controlled in from about 4.0 to 6.0 mole percent.

This experiment can be achieved successfully stable and continuous operation over a period of about 1000 hrs. except for a short time of start-of-run. The products were superior quality containing only minor amounts of asphaltenes and heavy metals as shown below.

| Desulfurized oil properties | | |
|---|---|---|
| specific gravity | (D$_{15}$/4° C.) | 0.913 |
| Sulfur | (wt %) | 0.30 |
| Asphaltenes | (") | trace |
| Vanadium | (ppm) | 1.0< |

The yield of the desulfurized oil was about 97% by volume, and chemical hydrogen consumption was 950 SCF/BBL. This example represented to illustrate that reaction conditions on this embodiment of the invention was slightly severe in comparison with these of Example 1, but that properties of product oil was more improved.

EXAMPLE 4

Figure 6:
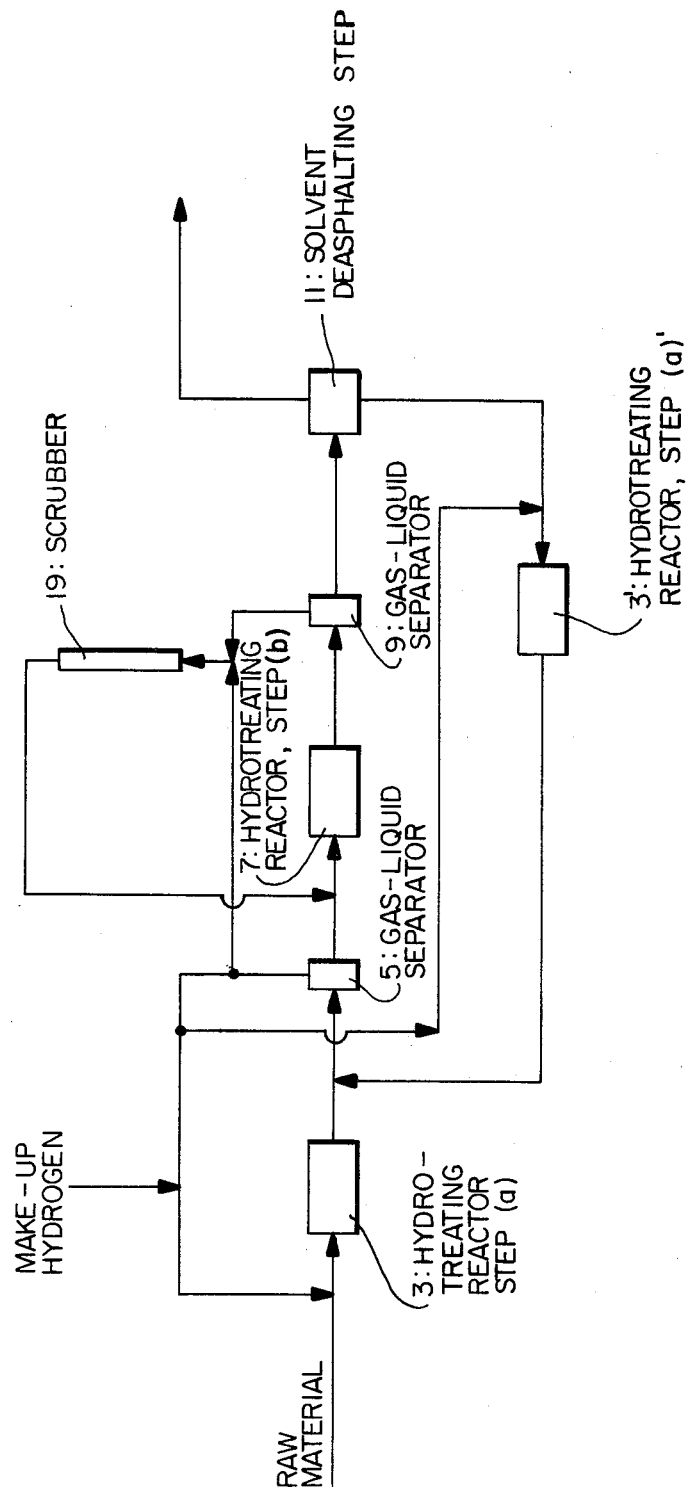

This example illustrates the case where the heavy fraction from separation step is subjected to the separately provided step (a)' which is under the same conditions as in step (a) and is recycled to step (b). FIG. 6 shows the flow diagram of this embodiment. Separation step 11 of liquid product from reactor 7, i.e. step (b) into the light fraction and the heavy fraction was a solvent deasphalting process. The raw material oil was Boscan Crude the same as Example 2. 300 cc/Hr of raw material was introduced to reactor 3, i.e. step (a). The reaction conditions of said reactor 3 are shown in the following table.

| Reaction conditions of reactor 3 | | |
|---|---|---|
| Temperature | (°C.) | 405 |
| Pressure | (kg/cm$^2$G) | 140 |
| LHSV | (Hr$^{-1}$) | 0.8 |
| H$_2$/oil ratio | (Nl/l) | 1,000 |

The catalyst used was prepared by supporting cobalt and molybdenum metals in the oxide state on the attapulgite obtained by treating natural attapulgus clay. The method of preparation was approximately the same as that employed in Example 1. The composition of catalyst is as shown below.

| Composition of catalyst | | |
|---|---|---|
| Al$_2$O$_3$ | (wt %) | 13.2 |
| MoO$_3$ | (") | 4.9 |
| CoO | (") | 1.7 |
| SiO$_2$ | (") | 55.7 |
| MgO | (") | 9.2 |
| Fe$_2$O$_3$ | (") | 2.9 |
| FeO | (") | 0.1 |
| CaO | (") | 1.8 |

The reactor effluent from reactor 3 was mixed with the reactor effluents from reactor 3', i.e. step (a)'. Said mixed reactor effluent was introduced to gas-liquid separator 5 and separated into a gaseous stream, rich in hydrogen and hydrogen sulfide, and a liquid product. The majority of said gaseous stream was recycled to the reactor 3 and the reactor 3'. On the other hand, said liquid product was mixed with hydrogen-rich gas from a gas scrubbing step 19 and sent to reactor 7. In the reactor 7 the reaction was carried out in a fixed bed isothermal reactor of gas-liquid co-current up-ward flow type, with filling of catalyst which was prepared by supporting metal components on alumina and the same as that used in step (b) of Example 1. The reaction conditions of said reactor 7 are as shown below.

| Reaction conditions of reactor 7 | | |
|---|---|---|
| Temperature | (°C.) | 375–420 |
| Pressure | (kg/cm$^2$G) | 140 |
| LHSV* | (Hr$^{-1}$) | 0.8 |
| H$_2$/oil ratio | (Nl/l) | 1,000 |

*Based on raw material oil

The reactor effluent from reactor 7 was introduced to gas-liquid separator 9 and separated into gaseous stream, rich in hydrogen and hydrogen sulfide, and a liquid product. Said gaseous stream from step 9 was mixed with a part of the hydrogen-rich gas from step 5 and sent to gas scrubbing step 19. In step 19, hydrogen sulfide and ammonia were removed. Said hydrogen-rich gas from step 19 was recycled to reactor 7 and used for reactor feed gas sources. On the other hand, the liquid product from step 9 was sent to step 11 and separated into the light fraction and the heavy fraction. Solvent deasphalting in step 11 was carried out at an average extractor temperature of 170° C., under a pressure of 40 kg/cm$^2$G which was sufficient to maintain a liquid phase operation at a solvent ratio of 7 vol/vol. In this deasphalting step, about 80% by volume of the above-described liquid product was separated. 70 cc/Hr of the heavy fraction was introduced to reactor 3' and hydrotreated to crack asphaltenes and to remove heavy metals. The requirement for the catalyst and operation in reactor 3' were the same as in step (a). Reaction conditions of reactor 3' are as shown in the following table.

| Reaction conditions in step (a)' | | |
|---|---|---|
| Temperature | (°C.) | 405 |
| Pressure | (kg/cm$^2$G) | 140 |
| LHSV | (Hr$^{-1}$) | 1.0 |
| H$_2$/oil ratio | (Nl/l) | 1,000 |

As described before, the liquid product was mixed with the liquid product of reactor 3 and introduced to gas-liquid separator 5. A desulfurized product oil produced by above-mentioned embodiment was of superior quality as shown below.

| Properties of desulfurized oil | | |
|---|---|---|
| Specific gravity | (D$_{15}$/4° C.) | 0.913 |
| Sulfur | (wt %) | 0.26 |
| Asphaltenes | (") | trace |
| Vanadium | (ppm) | 0.7 |

The yield of the desulfurized oil was about 97% by volume and the chemical hydrogen consumption was 820 SCF/BBL.

EXAMPLE 5

Figure 7:
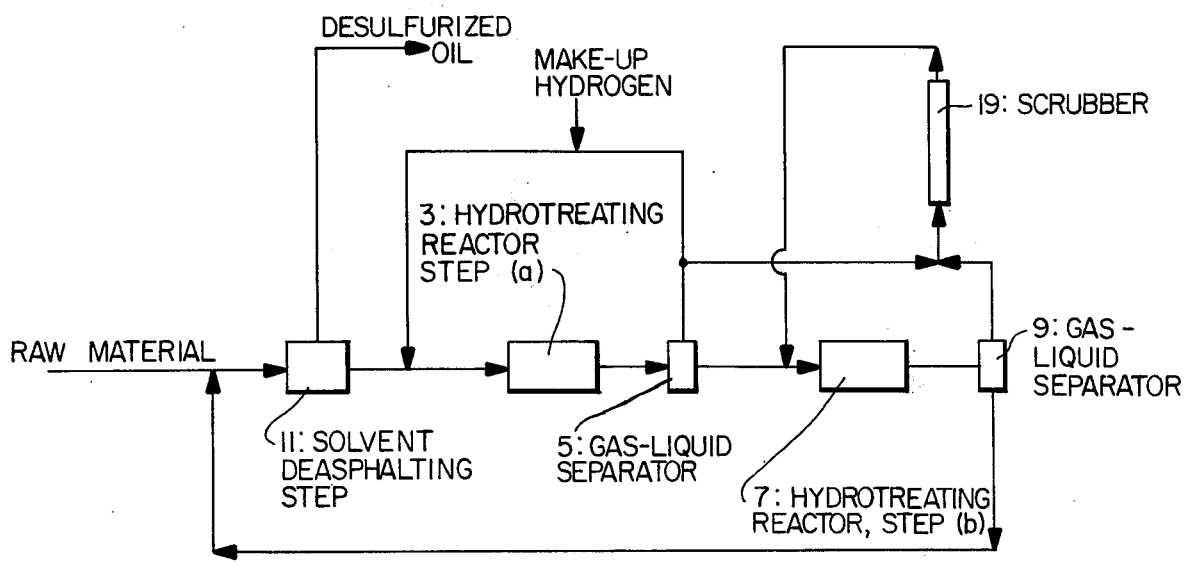

This example illustrates the case where raw material oil was mixed with the liquid product of step (b) and introduced to the separation step of the light fraction and the heavy fraction in the oil recycling system. FIG. 7 shows the flow diagram of this embodiment. As a raw material oil, use was made of atmospheric residue of Middle East crude, whose properties are as shown below.

| Properties of feed oil | | |
|---|---|---|
| Specific gravity | (D$_{15}$/4° C.) | 0.9567 |
| Asphaltenes | (wt %) | 2.87 |
| Sulfur | (") | 2.62 |
| Vanadium | (ppm) | 130 |

The raw material oil was mixed with the liquid product from reactor 7, i.e. step (b), and then the mixed oil was introduced to solvent deasphalting step 11 and separated into the light fraction and the heavy fraction. The butane deasphalting was carried out at an average extractor temperature of 125° C., under a pressure of 40 kg/cm$^2$G which was sufficient to maintain a liquid phase operation at a solvent ratio of 7.5 vol/vol. In this deasphalting step 11, about 60% by volume of above-described mixed oil was separated. The heavy fraction was withdrawn from said deasphalting step and mixed with hydrogen-rich gas from step 5 and was introduced into the reactor 3, i.e. step (a). The requirement for the catalyst and operation were as same as in the step (a) of the Example 1. The reaction conditions of reactor 3 are as shown below.

| Reaction conditions in step (a) | | |
| --- | --- | --- |
| Temperature | (° C.) | 405 |
| Pressure | (kg/cm$^2$G) | 140 |
| LHSV* | (Hr$^{-1}$) | 0.35 |
| H$_2$/oil ratio | (Nl/l) | 1,000 |

*Based on raw material oil

The reactor effluents from reactor 3 was introduced and separated into gaseous components, rich in hydrogen and hydrogen sulfide, in gas-liquid separator 5. The majority of gaseous components was recycled to the reactor 3 and used for feed gas sources. On the other hand, the liquid product was mixed with the hydrogen-rich gas from step 5 and sent to the reactor 7. The requirement for the catalyst and operation in the reactor 7 were the same as in step (b) of Example 1. The reaction conditions of reactor 7 are as shown below.

| Reaction conditions of reactor 7 | | |
| --- | --- | --- |
| Temperature | (°C.) | 370–420 |
| Pressure | (kg/cm$^2$G) | 140 |
| LHSV* | (Hr$^{-1}$) | 1.0 |
| H$_2$/oil ratio | (Nl/l) | 1,000 |

*Based on raw material oil

The reactor effluents from reactor 7 was introduced to gas-liquid separator 9 and separated into gaseous stream, rich in hydrogen and hydrogen sulfide, and a liquid product. Said gaseous stream was mixed with a part of hydrogen-rich gas from reactor 5 and sent to a gas scrubbing step 19. In gas scrubbing step 19, hydrogen and ammonia in said gaseous stream were removed. Said hydrogen-rich gas from step 19 was recycled to reactor 7 and used for reactor feed gas sources. On the other hand, the liquid product from step 9 was mixed with raw material oil as described before. According to this embodiment, a desulfurized oil was obtained from solvent deasphalting step 11. The properties of said desulfurized oil after the lapse of 350 Hr are as shown below.

| Properties of desulfurized oil | | |
| --- | --- | --- |
| Specific gravity | (D$_{15}$/4° C.) | 0.920 |
| Sulfur | (wt %) | 2.0 |
| Asphaltenes | (″) | trace |
| Vanadium | (ppm) | 18 |

The yield of the desulfurized oil was about 98% by volume, and the chemical hydrogen consumption was 420 SCF/BBL. Although sulfur still remains considerably as shown in the table and additional hydrodesulfurization is required to obtain more desulfurized oil, it is easy to hydrodesulfurize the asphaltene-free and heavy metal-free oil to a product of high quality by using the conventional hydrotreating process, e.g. the indirect desulfurization process of demetallized oil. According to this embodiment, the reaction efficiency of reactor 3 increases because the sulfur, asphaltenes and metals are concentrated by removing light fraction in the raw material oil.

What is claimed is:

1. A process for hydrodesulfurizing heavy hydrocarbon oil which contains asphaltene and heavy metals, the process comprising the steps of:
   (a) contacting said heavy oil with hydrogen and with a catalyst comprising a carrier containing magnesium silicate as a major component and having supported thereon one or more catalytic metal components, the metal of said metal components being selected from the metals of Groups Va, VIa and VIII of the Periodic Table, under a hydrogen-/oil ratio of 100–2000 normal l/l, a temperature of 350°–450° C., a pressure of 30–250 kg/cm$^2$G, and a liquid hourly spaced velocity of 0.1–10 Hr$^{-1}$;
   (b) contacting the reaction product from step (a) with hydrogen and with a catalyst comprising a refractory inorganic oxide having supported thereon one or more catalytic metal components, the metal of said metal components being selected from the metals of Groups Va, VIa and VIII of the Periodic Table and the carrier possessing a total pore volume of 0.50–0.80 cc/g and a pore size distribution such that the volume of pores having a diameter of 35–200 Å comprise 55–99% of the total pores and the volume of pores having a diameter greater than 200 Å comprise 10–45% of the total pore volume, and under a hydrogen/oil ratio of 100 to 2000 (normal l/l), a temperature of 350° to 450° C., a pressure of 30–250 kg/cm$^2$G, and a liquid hourly space velocity of 0.1–5 Hr$^{-1}$; and
   (c) separating the reaction product from step (b) into a hydrogen-rich gas and a desulfurized liquid product.

2. The process as described in claim 1, wherein the reaction product from step (a) is separated into a hydrogen-rich gas and a liquid product and the liquid product is contacted with hydrogen in the presence of the catalyst of step (b).

3. The process as described in claim 1, wherein the liquid product from step (c) is separated into a substantially asphaltene-free and heavy metal-free light fraction and a heavy fraction and the heavy fraction is recycled to step (a).

4. The process as described in claim 2, wherein the liquid product from step (c) is separated into a substantially asphaltene-free and heavy metal-free light fraction and a heavy fraction and the heavy fraction is recycled to step (a).

5. The process as described in claim 1, wherein the liquid product from step (c) is separated into a substantially asphaltene-free and heavy metal-free light fraction and a heavy fraction and the heavy fraction is recycled to step (b).

6. The process as described in claim 2, wherein the liquid product from step (c) is separated into a substantially asphaltene-free and heavy metal-free light fraction and a heavy fraction and the heavy fraction is recycled to step (b).

7. The process as described in claim 1, 2, 3, 4, 5, or 6, wherein the carrier in step (a) has the composition: 30–65% by weight SiO$_2$; 10–30% by weight MgO; less than 20% by weight Al$_2$O$_3$; less than 25% by weight Fe$_2$O$_3$; less than 5% by weight FeO and less than 3% by weight CaO.

8. The process as described in claim 7, wherein said carrier is sepiolite.

9. The process as described in claim 7, wherein said carrier is attapulgite.

10. The process as described in claim 7, wherein said carrier is palygorskite.

11. The process as described in claim 1, 2, 3, 4, 5 or 6, wherein said metal of said catalytic metal component of the catalyst of steps (a) and (b) is selected from the group consisting of Co, Mo, Ni, V and W.

12. The process as described in claim 7, wherein said metal of said catalytic metal component of the catalyst of steps (a) and (b) is selected from the group consisting of Co, Mo, Ni, V and W.

13. The process as described in claim 8, 9 or 10, wherein said metal of said catalytic metal component of the catalyst of steps (a) and (b) is selected from the group consisting of Co, Mo, Ni, V and W.

14. The process as described in claim 1, 2, 3, 4, 5 or 6, wherein in step (a) the hydrogen/oil ratio is 500 to 1000 normal 1/l, the temperature is 390°–420° C., the pressure is 80–160 kg/cm$^2$G and the liquid hourly space velocity is 0.2 to 5 Hr$^{-1}$.

15. The process as described in claim 1, 2, 3, 4, 5 or 6, wherein in step (b), the hydrogen/oil ratio is 500 to 1000 normal 1/l, the temperature is 390°–420° C., the pressure is 80–160 kg/cm$^2$G and the liquid hourly space velocity is 0.2 to 2 Hr$^{-1}$.

16. The process as described in claim 3, 4, 5 or 6, wherein the liquid product from step (c) is separated into the light fraction and the heavy fraction by solvent deasphalting.

17. The process as described in claim 5 or 6, wherein said heavy fraction is hydrotreated in separately provided step (a)' with a catalyst which was prepared by supporting one or more catalytic metal components, the metals being selected from the metals of Groups Va, VIa and VIII of the Periodic Table, under a hydrogen/oil ratio of 100–2000 normal 1/l, a temperature of 350°–450° C., a pressure of 30–250 kg/cm$^2$G, and a liquid hourly space velocity of 0.1–10 Hr$^{-1}$ and the hydrotreated heavy fraction is mixed with said reaction product from step (a) to step (b).

18. The process as described in claim 18, wherein step (a)' is provided under the conditions that the hydrogen/oil ratio is 500 to 1000 normal 1/l, the temperature is 390°–420° C., the pressure is 80–160 kg/cm$^2$G and the liquid hourly space velocity is 0.2 to 5 Hr$^{-1}$.

19. A process for hydrodesulfurizing heavy hydrocarbon oil which contains asphaltene and heavy metals, the process comprising the steps of:

(a) separating said heavy hydrocarbon oil and a desulfurized liquid product, as hereinafter delineated, into a substantially desulfurized asphaltene-free and heavy metal-free light fraction and a heavy fraction;

(b) contacting the heavy fraction from step (a) with hydrogen and with a catalyst comprising a carrier containing magnesium silicate as a major component and having supported thereon one or more catalytic metal components, the metal of said metal components being selected from the metals of Groups Va, VIa and VIII of the Periodic Table, under a hydrogen/oil ratio of 100–2000 normal 1/l, a temperature of 350°–450° C., a pressure of 30–250 kg/cm$^2$G, and a liquid hourly space velocity of 0.1–10 Hr$^{-1}$;

(c) contacting the reaction product from step (b) with hydrogen and with a catalyst comprising a refractory inorganic oxide having supported thereon one or more catalytic metal components, the metal of said metal components being selected from the metals of Groups Va, VIa and VIII of the Periodic Table and the carrier possessing a total pore volume of 0.50–0.80 cc/g and a pore size distribution such that the volume of pores having a diameter of 35–200 Å comprise 55–99% of the total pores and the volume of pores having a diameter greater than 200 Å comprise 10–45% of the total pore volume, and under a hydrogen/oil ratio of 100 to 2000 (normal 1/l), a temperature of 350° to 450° C., a pressure of 30–250 kg/cm$^2$G, and a liquid hourly space velocity of 0.1–5 Hr$^{-1}$; and (d) separating the reaction product from step (c) into a hydrogen-rich gas and a desulfurized liquid product and combining said liquid product with said heavy hydrocarbon oil in step (a).

20. The process as described in claim 19, wherein said metal of said catalytic metal component of the catalyst of steps (b) and (c) is selected from the group consisting of Co, Mo, Ni, V and W.

* * * * *